(12) United States Patent
Sang et al.

(10) Patent No.: US 9,028,991 B2
(45) Date of Patent: May 12, 2015

(54) FUEL CELL SYSTEM WITH VARIABLE COANDA AMPLIFIERS FOR GAS RECIRCULATION AND SYSTEM PRESSURE REGULATION

(75) Inventors: Jochen Sang, Kirchheim/Teck (DE); Andreas Knoop, Esslingen (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 2234 days.

(21) Appl. No.: 10/589,199

(22) PCT Filed: Feb. 11, 2005

(86) PCT No.: PCT/US2005/004516
§ 371 (c)(1),
(2), (4) Date: Jun. 29, 2007

(87) PCT Pub. No.: WO2005/081348
PCT Pub. Date: Sep. 1, 2005

(65) Prior Publication Data
US 2007/0259226 A1    Nov. 8, 2007

Related U.S. Application Data

(60) Provisional application No. 60/566,508, filed on Apr. 29, 2004.

(30) Foreign Application Priority Data

Feb. 13, 2004    (DE) .......................... 10 2004 007 104

(51) Int. Cl.
*H01M 8/00*    (2006.01)
*F15C 1/06*    (2006.01)
(Continued)

(52) U.S. Cl.
CPC . *F15C 1/003* (2013.01); *F15C 1/08* (2013.01); *H01M 8/04089* (2013.01); *H01M 8/04097* (2013.01); *Y02E 60/50* (2013.01)

(58) Field of Classification Search
USPC .............................. 251/129.06; 137/891, 893
See application file for complete search history.

(56) References Cited

U.S. PATENT DOCUMENTS 2,856,234 A * 10/1958 McNair et al. ................ 137/584
5,433,365 A * 7/1995 Davies ......................... 226/97.4
(Continued)

FOREIGN PATENT DOCUMENTS

DE    100 01 717 C1    4/2001
EP    0456931    * 10/1990
(Continued)

OTHER PUBLICATIONS

Notification of Reason for Refusal with English translation dated Mar. 9, 2010 (Five (5) pages).
Form PCT/IPEA/416 and PCT/IPEA/409 (Six (6) pages), 2006.

*Primary Examiner* — Bijay Saha
(74) *Attorney, Agent, or Firm* — Crowell & Moring LLP

(57) ABSTRACT

A Coanda flow amplifier has a suction intake, an outlet, a fluid channel extending between the suction intake and the outlet, and a drive-flow inlet, which is fluidly connected to the fluid channel via a drive-flow discharge slit, whereby the flow cross section of the drive-flow discharge slit is variably adjustable. In a method to operate the Coanda flow amplifier, the variably adjustable flow cross section of the drive-flow discharge slit is chosen such that a pressure ratio between an output pressure of the drive flow when it leaves the drive-flow discharge slit, and an intake pressure of the drive flow when it enters the drive-flow discharge slit, does not exceed a critical pressure ratio. A fuel cell system comprises at least one fuel cell, a fluid source, a fluid line, and a Coanda flow amplifier arranged in the fluid line, whereby the Coanda flow amplifier is equipped with a drive-flow discharge slit with a variably adjustable flow cross section.

13 Claims, 3 Drawing Sheets

(51) Int. Cl.
*F15C 1/00* (2006.01)
*F15C 1/08* (2006.01)
*H01M 8/04* (2006.01)

(56) References Cited

U.S. PATENT DOCUMENTS

| | | | |
|---|---|---|---|
| 5,974,802 A | 11/1999 | Blake | |
| 6,739,574 B1 * | 5/2004 | Simon | 251/129.06 |
| 2001/0024747 A1 | 9/2001 | Sang | |

FOREIGN PATENT DOCUMENTS

| | | |
|---|---|---|
| EP | 0 456 931 B1 | 11/1991 |
| JP | 49-19292 B | 5/1974 |
| JP | 57-71000 A | 5/1982 |
| JP | 59-101961 U | 7/1984 |
| JP | 8-233141 A | 9/1996 |
| JP | 10-37993 A | 2/1998 |
| JP | 2002-352825 A | 12/2002 |
| JP | 2003-115317 A | 4/2003 |

* cited by examiner

US 9,028,991 B2

FUEL CELL SYSTEM WITH VARIABLE COANDA AMPLIFIERS FOR GAS RECIRCULATION AND SYSTEM PRESSURE REGULATION

This application claims the priority of German Patent Document No. 102004007104.7, filed Feb. 13, 2004 and U.S. Patent Application Ser. No. 60/566,508, filed Apr. 29, 2004), the disclosures of which are expressly incorporated by reference herein.

The present application relates to a Coanda flow amplifier, comprising a suction intake, an outlet, a fluid channel extending between the suction intake and the outlet, and a drive flow inlet, which is fluid-connected to the fluid channel via a drive-flow discharge slit, as well as to a method of operating such a Coanda flow amplifier. The application further relates to a fuel cell system comprising at least one fuel cell, one fluid source, one fluid line, and one Coanda flow amplifier arranged in the fluid line, whereby both a suction intake and an outlet of the Coanda flow amplifier are fluid-connected to the fluid line, and whereby a drive flow inlet of the Coanda flow amplifier is fluid-connected to the fluid source.

BACKGROUND OF THE INVENTION

A Coanda flow amplifier of the above type is disclosed, for example, in U.S. Pat. No. 5,974,802. The operating principle of a Coanda flow amplifier is based on the phenomenon known as the Coanda effect (i.e., a fluid flowing along a curved surface tends to follow the outline of the curved surface). Consequently, a Coanda flow amplifier usually includes an inlet for a fluid flow to be amplified, a fluid channel, which is bordered by a curved surface and which—along the flow direction of the flow to be amplified—at first narrows and subsequently widens with a funnel shape, and a fluid outlet. A drive-flow inlet is provided, radially with respect to the fluid channel, in an area upstream of the constriction of the fluid channel. The inlet is fluid-connected with the fluid channel via a drive-flow discharge slit.

The drive-flow inlet serves to supply the Coanda flow amplifier with a drive fluid at a given intake pressure that subsequently reaches a high flow velocity (typically sonic velocity) when passing through the drive-fluid discharge slit, and subsequently flows through the fluid channel along the surface that borders the fluid channel. This generates suction in the area of the intake of the Coanda flow amplifier, as a result of which large volumes of the fluid to be conveyed by the Coanda flow amplifier are sucked into the intake.

As described in U.S. Pat. No. 5,974,802, a Coanda flow amplifier of this type can be arranged in the exhaust gas recirculation line of an internal combustion engine, to recirculate exhaust gases produced by the internal combustion engine.

German patent document DE 100 01 717 C1 describes the use of a Coanda flow amplifier in a fuel cell system, which comprises a fuel cell unit, a cathode gas supply line connected to the cathode side of the fuel cell unit, a cathode exhaust gas return line for the recirculation of cathode exhaust gas that is also connected to the cathode side of the fuel cell unit, as well as an anode exhaust gas return line that serves to recirculate the anode exhaust gas and is connected to the anode side of the fuel cell unit. The Coanda flow amplifier may be arranged in the cathode gas supply line and/or in the cathode exhaust gas return line of the fuel cell system, whereby a drive-flow inlet of the Coanda flow amplifier is connected to a compressed-air source via a compressed-air line. Alternatively, the Coanda flow amplifier may be arranged in the anode exhaust gas return line. In this case, the drive-flow inlet of the Coanda flow amplifier is connected to a fuel gas pressure tank, which may for example contain gaseous or liquid hydrogen.

As explained above, for proper operation of the Coanda flow amplifier it is necessary that the drive fluid, during its passage through the drive-flow discharge slit, be accelerated to a very high flow velocity, typically the velocity of sound. This can be ensured if a pressure ratio between the discharge pressure of the drive flow when it leaves the drive-flow discharge slit, and an intake pressure of the drive flow when it enters into the drive-flow discharge slit, does not exceed a critical pressure ratio set in dependence on the desired flow velocity of the drive fluid when it leaves the drive-fluid discharge slit. For an acceleration of the drive-fluid flow to sonic velocity (Mach 1) and diatomic gases (Kappa=1.4) the critical pressure ratio is calculated as 0.528. To prevent the critical pressure ratio from being exceeded (i.e., to ensure a proper functioning of the Coanda flow amplifier), the drive fluid is usually supplied to the Coanda flow amplifier at a sufficiently high supply pressure, which can be pre-set by means of a pressure controller.

However, in some applications, and particularly for the use of a Coanda flow amplifier in a fuel cell system, the problem arises that the mass flow of the drive fluid to be supplied to the Coanda flow amplifier, and thus the drive fluid's supply pressure, will also be affected by other system parameters. For example, if the Coanda flow amplifier is to be used in a fuel cell system to recirculate the anode exhaust gas, and if the fuel gas to be supplied to the anode side of the fuel cell is to be used as drive fluid, then the fuel gas volume to be supplied to the fuel cell depends on the fuel gas consumption in the fuel cell (i.e., on the load state of the fuel cell). Thus, under low-load conditions of the fuel cell the pre-set intake pressure of the drive fluid may not be sufficient to accelerate the drive-fluid flow to a sufficiently high velocity when it passes through the drive-fluid discharge slit, so that the proper functioning of the Coanda flow amplifier can no longer be ensured.

SUMMARY OF THE INVENTION

One object of the present invention is to provide a Coanda flow amplifier, a method of operating a Coanda flow amplifier, as well as a fuel cell system equipped with a Coanda flow amplifier, in which the proper functioning of the Coanda flow amplifier is ensured even if the mass flow rate of the drive fluid passing through the drive-fluid discharge slit of the Coanda flow amplifier is variable.

This and other objects and advantages are achieved by the Coanda flow amplifier according to the present systems and methods, in which a flow cross section of its drive-flow discharge slit can be variably adjusted. When a low flow rate of the drive flow is to be fed to the fluid channel of the Coanda flow amplifier, an accordingly small flow cross section of the drive-flow discharge slit can be set. Inversely, a larger flow cross section of the drive-flow discharge slit, can be set if a greater flow rate of the drive fluid is to be supplied to the fluid channel of the Coanda flow amplifier. Since the cross-sectional area of the drive-flow discharge slit for a critical flow is directly proportional to the flow rate of the drive fluid, it is possible to precisely meter the desired quantity of drive fluid to be supplied to the fluid channel of the Coanda flow amplifier by varying the cross-sectional area of the drive-flow discharge slit.

In addition, in the operation of the Coanda flow amplifier according to the present systems and methods, the cross-sectional area of the drive-flow discharge slit can be selected based on the supply pressure of the drive fluid. In this way, when the drive-flow discharge slit is passed a pressure ratio is established between the output pressure of the drive-fluid flow when it leaves the drive flow discharge slit, and the intake pressure of the drive-fluid flow when it enters the drive-fluid discharge slit, which pressure ratio does not exceed the critical pressure ratio of the drive fluid. As a result, proper functioning of the Coanda flow amplifier can be ensured in a simple manner even in the case of varying mass flow rates of the drive fluid to be supplied to the fluid channel, or in the case of varying supply pressures of the drive-fluid flow. Moreover, the need to employ a separate pressure controller to pre-set the supply pressure of the drive fluid is eliminated when using the Coanda flow amplifier according to the present systems and methods.

Preferably, the Coanda flow amplifier according to the present systems and methods is designed so that the drive-fluid discharge slit can be completely closed (i.e., the supply of drive fluid into the fluid channel of the Coanda flow amplifier can be interrupted). As a result, a separate valve to interrupt the supply of drive fluid to the Coanda flow amplifier is no longer required.

In one embodiment of the invention, the Coanda flow amplifier comprises a flow-guiding element that is arranged between the suction intake and the outlet, and is axially displaceable along the longitudinal axis of the Coanda flow amplifier. The fluid channel in the Coanda flow amplifier includes a first section, which extends from the suction intake of the Coanda flow amplifier to an upstream face of the flow-guiding element, a second section executed in the flow-guiding element, and of a third section, which extends from the downstream face of the flow-guiding element to the outlet of the Coanda flow amplifier.

In another embodiment, the suction intake of the Coanda flow amplifier is arranged in a first housing section, and the drive-flow discharge slit is formed between a downstream face of the first housing section and an upstream face of the flow-guiding element. As a result, the flow cross section of the drive-flow discharge slit is determined by the distance of the upstream face of the flow-guiding element from the downstream face of the first housing section, and can be varied as desired in a simple manner by axially displacing the flow-guiding element along the longitudinal axis of the Coanda flow amplifier.

The second section of the fluid channel formed in the flow-guiding element may be bordered by a curved interior wall, so that the cross section of the second fluid channel section (starting from the upstream face of the flow-guiding element, in the flow direction of the fluid) in the fluid channel has a convergent divergent shape (i.e., it initially narrows, and then widens again). Because of the Coanda effect, drive fluid fed through the drive-flow discharge slit will flow with high velocity along the curved interior wall of the flow-guiding element, which gives rise to a suction effect in the area of the suction intake and thus to the flow-amplifying effect of the Coanda flow amplifier. The first fluid-channel section located in the first housing section has a constant cross section over its length. Alternatively, it is also possible to execute the first fluid-channel section in a downstream end area with a fluid-channel cross section that is divergent along the fluid flow direction (i.e., with a cross section that widens along the fluid-flow direction in the fluid channel).

Preferably, at least in the area of the drive-flow discharge slit, the fluid-flow element is surrounded by a chamber that connects the drive-flow inlet with the drive-flow discharge slit. This chamber, for example, may be an annular chamber that at least partially surrounds the flow-guiding element and is fluid-connected to the drive-flow inlet that is arranged radially with respect to the flow-guiding element.

In yet another embodiment, the axially displaceable flow-guiding element of the Coanda flow amplifier carries through into a second housing section and is guided in the second housing section in a sealed manner.

As an axial guide for the flow-guiding element, the second housing section may, for example, contain a projection that projects radially inward, with an upstream face that forms the border of the chamber that at least partially surrounds the flow-guiding element. For the purpose of sealing the flow-guiding against the second housing section, a sealing element may be provided, which may, for example, be placed into a groove formed in the outer circumference of the flow-guiding element.

The outlet of the Coanda flow amplifier may be located in a third housing section, whereby a downstream section of the flow-guiding element protrudes into the third housing section and is guided in a sealing manner in the third housing section. In this case, the third section of the fluid channel is executed in the third housing section and may possess a constant cross section or a cross section that widens along the fluid flow direction in the fluid channel. The first, second, and third housing sections may be provided as separate components, and may, for example, be connected to each other by means of a screw connection. Thus, the components of the Coanda flow amplifier can in a simple manner be installed in the housing that comprises three separate sections. In alternative embodiments, the housing may be a single part, or the housing may comprise three housing sections in which any two of the three housing sections are executed as a single part.

When sealing the downstream section of the flow-guiding element with respect to the third housing section, it is necessary to take into account that a gap will be present between the downstream face of the flow-guiding element and an upstream face on the third housing section when the drive-flow discharge slit is closed or only partially open (i.e., when the flow-guiding element has been axially displaced against the fluid flow direction in the fluid channel). Thus, for the purpose of sealing this gap, a sealing element may be provided, which may be arranged in a groove executed on the third housing section and acts together with a circumferential surface of the flow-guiding element.

Moreover, because the movement that must be executed by the flow-guiding element to set the flow cross section of the drive-flow discharge slit is very small, one can use quasi-static seals such as, for example, inexpensive O-ring seals, to provide a seal between the flow-guiding element and the second and third housing section.

In another embodiment of the present systems and methods, the Coanda flow amplifier comprises an actuating element to axially displace the flow-guiding element. The actuating element may be arranged, for example, in the third housing section, and in one embodiment a piezo actuator may be used for this purpose. If a piezo actuator is used, it becomes possible to very precisely control the movement to be executed by the flow-guiding element by means of a corresponding current to the piezo actuator, which makes it possible to very accurately adjust the flow cross section of the drive-flow discharge gap.

In an alternate embodiment of the present systems and methods, the flow-guiding element is resiliently pre-loaded opposite to the fluid flow direction in the fluid channel in order to close the drive-flow discharge slit when the actuating element is in its inoperative state (fail safe/NC). To generate the desired resilient pre-load, one may, for example, provide a spring element with ends that rest on the upstream face of the projection that is provided on the second housing section and protrudes radially inward, and on a flange section that is provided on the outer circumference of the flow-guiding element and protrudes radially outward.

According to some embodiments of the present systems and methods of operating a Coanda flow amplifier, a variably adjustable flow cross section of the drive-flow discharge slit may be chosen in such a way that the pressure ratio of the output pressure of the drive flow when exiting from the drive-flow discharge slit and the intake pressure of the drive flow when entering the drive-flow discharge slit does not exceed a critical pressure ratio. The present systems and methods ensure that the drive-fluid flow during its passage through the drive-flow discharge slit is accelerated to a sufficiently high flow velocity—defined by the critical pressure ratio—even in the case of varying mass flow rates of the drive-fluid to be supplied to the fluid channel of the Coanda flow amplifier, or in the case of varying supply pressures of the drive-fluid flow, so that a proper functioning of the Coanda flow amplifier can be maintained.

For an ideal diatomic gas the critical pressure ratio has the value 0.528. If the flow cross section of the drive-flow discharge slit is chosen so that the pressure ratio between the output pressure of the drive flow when leaving the drive-flow discharge slit and the intake pressure of the drive flow when entering the drive-flow discharge slit does not exceed the critical pressure ratio, then it can be ensured that the drive-fluid flow during its passage through the drive-flow discharge slit is accelerated to at least sonic velocity (Mach 1).

The variable flow cross section of the drive-flow discharge slit may be adjusted so that the pressure ratio between the output pressure of the drive-flow when leaving the drive-flow discharge slit and the intake pressure of the drive-flow when entering the drive-flow discharge slit is equal to the critical pressure ratio. This implementation of the present systems and methods makes it possible to precisely control the flow velocity of the drive-fluid flow when it leaves the drive-flow discharge slit. This implementation may be at the point of the critical pressure ratio, since the momentum exchange between the drive-fluid flow and the fluid flow to be amplified is maximized for a drive-fluid flow that flows with sonic velocity when it leaves the drive-flow discharge slit, which may create a particularly good flow-amplifying effect of the Coanda flow amplifier.

In one embodiment of the present systems and methods, a Coanda flow amplifier is arranged in a fluid line, so that the flow cross section of the drive-flow discharge slit can be variably adjusted. The use of a Coanda flow amplifier with a variably adjustable flow cross section of the drive-flow discharge slit makes it possible to ensure a proper functioning of the Coanda flow amplifier even in the case of varying supply pressures of the drive-fluid flow that is supplied from the fluid source to the drive-flow inlet of the Coanda flow amplifier. Furthermore, it becomes possible to reduce the number of components of the overall system, since for example a pressure controller, which for the purpose of pre-adjusting the supply pressure of the drive-fluid to be supplied to the Coanda flow amplifier would be arranged at a fluid line connecting the fluid source with the drive-flow inlet, is no longer necessary.

In a first embodiment of the fuel cell system and method according to the present invention, the fluid line may be a purge-gas feed line (feed) that is connected to the fuel cell and is used to introduce a purge gas (i.e., air, into the fuel cell). The drive-flow inlet of the Coanda flow amplifier may, for example, be supplied with purge air via a pressurized-air line (e.g., in the form of leakage air or overflow air from a high-pressure compressor or from another pressurized-air source in the system).

The Coanda flow amplifier then draws in a high flow volume of purge air from the surroundings into its suction intake. In addition to the fuel cell, other components of the fuel cell system may be connected with the purge-gas feed line and be ventilated by the purge-gas flow generated by the Coanda flow amplifier.

In a second embodiment of the fuel cell system, the fluid line may be a cathode gas feed line connected to the fuel cell that is used to supply the cathode side of the fuel cell with a cathode gas, for example air. In a manner similar to the one already described in connection with the first embodiment of the fuel cell system, the drive-flow inlet of the Coanda flow amplifier may, for example, be supplied via a pressurized-air line with air as drive fluid for the Coanda flow amplifier.

In a third embodiment of a fuel cell system, the fluid line may be a cold-starting gas feed line that is connected to a cold-starting component of the fuel cell system and is used to supply a cold-starting gas to the cold-starting component during the cold-starting phase of the system. During a cold start, the role of the cold-starting component is to heat the fuel cell system to operating temperature as quickly as possible. Again, air can be used as drive fluid for the Coanda flow amplifier, whereby the air is supplied to the drive-flow inlet of the Coanda flow amplifier, via a pressurized-air line.

In a fourth embodiment of a fuel cell system, the fluid line may be an exhaust gas recirculation line for the recirculation of fuel cell exhaust gas. This exhaust gas recirculation line may, for example, be a cathode exhaust gas recirculation line, which is used to return at least part of the cathode exhaust gas to the cathode inlet side of the fuel cell, for example in order to improve the water balance of the fuel cell system or to improve equipartition in the fuel cell. For the purpose of supplying a drive fluid to the Coanda flow amplifier, the drive-fluid inlet of the Coanda flow amplifier may, for example, be connected to a pressurized-air source via a pressurized-air line.

In alternative embodiments, the exhaust gas recirculation line is an anode exhaust gas recirculation line for the recirculation of anode exhaust gas, whereby the fuel cell is supplied with anode gas from the fluid source (i.e., the anode gas that is to be supplied to the anode side of the fuel cell is at the same time used as drive fluid for the Coanda flow amplifier). The anode gas that is used as drive fluid for the Coanda flow amplifier may, for example, be gaseous hydrogen.

When using a Coanda flow amplifier in which the flow cross section of the drive-flow discharge slit can be variably adjusted, an appropriate choice of the flow cross section of the drive-flow discharge gap allows a very precise control of the mass flow rate of the anode gas to be supplied to the anode side of the fuel cell. Due to this, the Coanda flow amplifier additionally assumes a metering function to meter the anode gas volume, which is to be supplied to the anode side of the fuel cell and which is dependent on the load condition of the fuel cell.

Other objects, advantages and novel features of the present invention will become apparent from the following detailed description of the invention when considered in conjunction with the accompanying drawings.

DETAILED DESCRIPTION OF THE INVENTION

Figure 1:
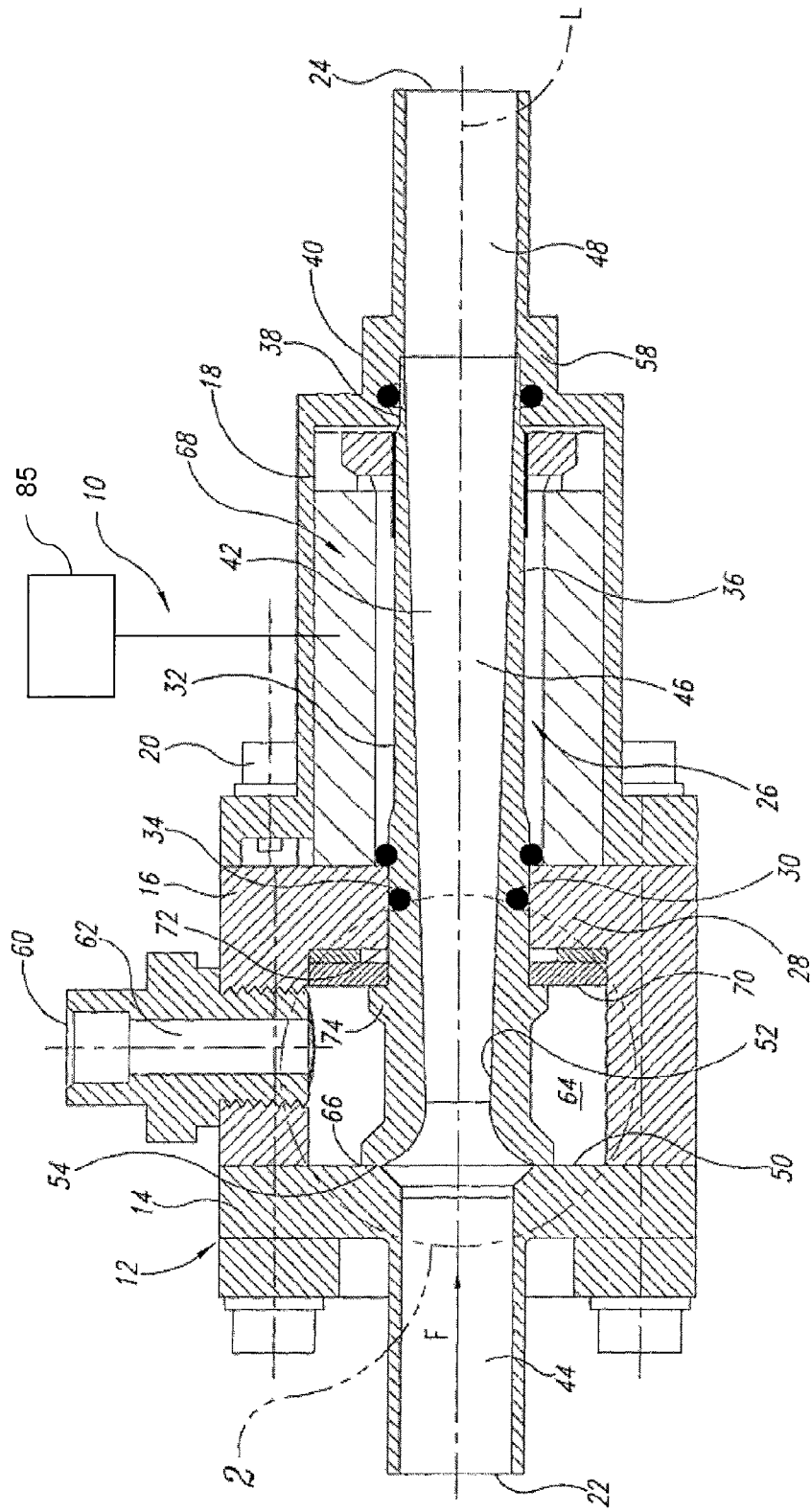
FIG. 1 shows a longitudinal section of one embodiment of a Coanda flow amplifier according to the present systems and methods.

Referring to FIG. 1, a Coanda flow amplifier 10 is shown with a three-part housing 11, comprising a first housing section 14, a second housing section 16, and a third housing section 18. Each of the first, second, and third housing sections is formed as a separate component, and the three components are rigidly connected to each other by a screw connection 20. The Coanda flow amplifier 10 has a suction intake 22 in the first housing section 14 and an outlet 24 in the third housing section 18.

Arranged in the housing 12 is a flow-guiding element 26, which is guided in the housing 12 axially displaceable along a longitudinal axis L of the Coanda flow amplifier by a projection 28 of the second housing section 16 that protrudes radially inward, and which is sealed against the second housing section 16 by means of a first O-ring seal 30.

The first O-ring 30 is arranged in a groove 34 that is provided on an essentially cylindrical outer circumference 32 of the flow-guiding element 26. A downstream section 36 of the flow-guiding element 26 projects into the third housing section 18 and is guided in a sealed manner in the third housing section 18. For the purpose of sealing the downstream section 36 of the flow-guiding element 26 against the third housing section 18, a second O-ring seal 38 is provided that is arranged in a groove 40 formed on the third housing section 18.

A fluid channel 42 extends between the suction intake 22 and the outlet 24, whereby a first section 44 of the fluid channel 42 is formed in the first housing section 14, a second section 46 of the fluid channel 42 is formed in the flow-guiding element 26, and a third section 48 of the fluid channel 42 is formed in the third housing section 18. The first fluid-channel section 44 extends from the suction intake 22 to a downstream face 50 of the first housing section 14 and in a downstream end area possesses a cross section that widens along the fluid-flow direction F in the fluid channel 42. The second section 46 of the fluid channel 42, which is provided in the flow-guiding element 26, is bordered by a curved interior wall 52 of the flow-guiding element 26, so that, starting from the upstream face 54 of the fluid-guiding element 26, the cross section of the second fluid-channel section 46 at first narrows and subsequently widens again along the fluid-flow direction F in the fluid channel 42. The third section 48 of the fluid channel 42 provided in the third housing section 18 extends from an upstream face 58 on the third housing section 18 to the outlet 24 and possesses a constant cross section along the fluid-flow direction F in the fluid channel 42.

Radially with respect to the flow-guiding element 26, a drive-flow inlet (feed) 60 is arranged in the second housing section 16, whereby the drive-flow inlet 60 is fluid-connected with an annular chamber 64—which surrounds an upstream section of the flow-guiding element 26—via a connecting line 62.

Figure 2:
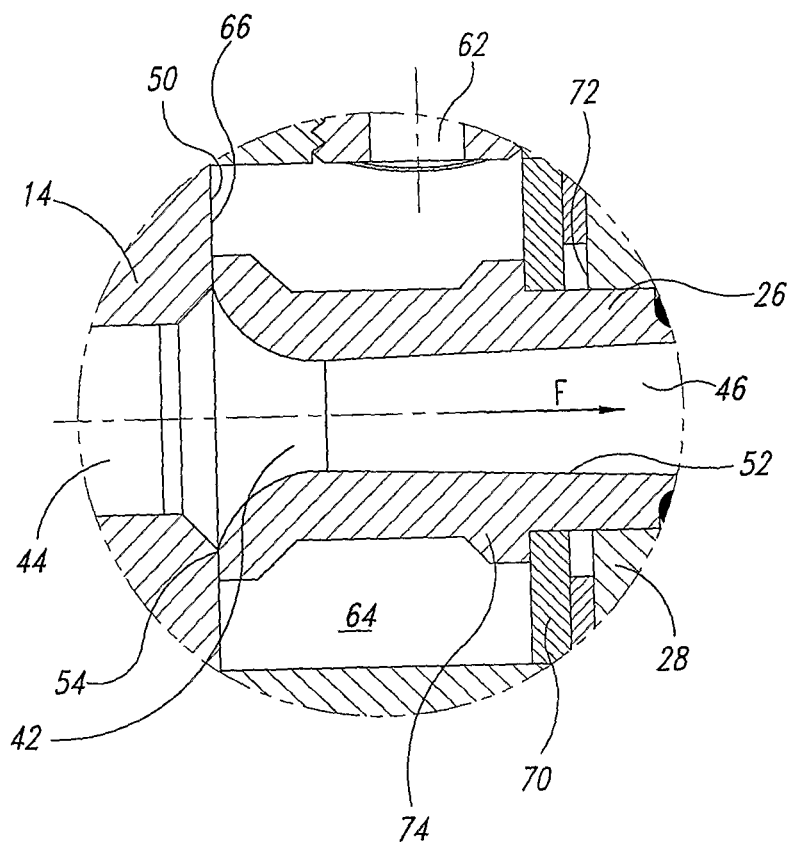
FIG. 2 shows a detail of the Coanda flow amplifier shown in FIG. 1.

As illustrated in more detail by FIG. 2, the annular chamber 64 is connected with the fluid channel 42 in a fluid-conducting manner via a drive-flow discharge slit 66 that is formed between the downstream face 50 of the first housing section 14 and the upstream face 54 of the flow-guiding element 26. Thus, the flow cross section of the drive-flow discharge slit 66 is set by the distance of the downstream face 50 of the first housing section 14 from the upstream face 54 of the flow-guiding element 26 and can be variably adjusted by an axial displacement of the flow-guiding element 26 in the housing 12 along the longitudinal axis L of the Coanda flow amplifier 10. Pushing the flow-guiding element 26 sufficiently far against the fluid-flow direction F in the fluid channel 42, so that the upstream face 54 of the flow-guiding element 26 comes into contact with the downstream face 50 of the first housing section 14, interrupts the fluid connection between the drive-flow inlet 60 and the fluid channel 42, so that the supply of drive fluid into the fluid channel 42 of the Coanda flow amplifier 10 is interrupted.

An actuating element 68 in the form of a piezo actuator (FIG. 1) is provided to effect the axial displacement of the flow-guiding element 26. A spring element 70 has one end which rests on an upstream face 72 of the projection 28 that projects radially inward and is formed on the second housing section 16, and another end of which rests on a flange section 74 that projects radially outward and is formed on the outer circumference 32 of the flow-guiding element 26. The spring element 70 resiliently pre-loads the flow-guiding element 26 in a direction opposite to the fluid-flow direction F in the fluid channel 42. As a result of the pre-loading applied by the spring element 70, the upstream face 54 of the flow-guiding element 26 is pushed against the downstream face 50 of the first housing section 14, so that the drive-flow discharge slit 66 will be closed when the actuating element 68 is in its inactive state.

During its operation, the Coanda flow amplifier of FIGS. 1 and 2 is supplied via the suction intake 22 with a fluid flow to be amplified. The drive flow inlet 60 is connected with a drive-fluid source, from which the Coanda flow amplifier 10 is supplied with pressurized drive fluid. Should the flow-amplifying effect of the Coanda flow amplifier 10 not be desired during certain operating phases, then the piezo actuator is not supplied with energy, so that the drive-flow discharge gap 66 remains closed due to the pre-load applied onto the flow-guiding element 26 by the spring element 70, As a result, the supply of drive fluid into the fluid channel 42 of the Coanda flow amplifier 10 is interrupted.

On the other hand, if the flow-amplifying effect of the Coanda flow amplifier 10 is desired, then the flow-guiding element 26 is shifted by the piezo actuator along the fluid flow direction F in the fluid channel 42, which opens the fluid connection between the drive-fluid inlet 60 and the fluid channel 42. During such operation, the flow cross section of the drive-flow discharge slit 66 is chosen by a suitable displacement of the flow-guiding element 26 in such a way that the desired mass flow rate of drive fluid is supplied to the fluid channel 42.

An optimum momentum exchange between the drive fluid flowing through the drive-flow discharge slit 66 and the fluid flow supplied via the suction intake 22 is possible if the drive fluid flows with sonic velocity (Mach 1) when leaving the drive-flow discharge slit 66. This can be implemented, if a pressure ratio between an output pressure of the drive-fluid flow when it leaves the drive-flow discharge slit 66 and an intake pressure of the drive-fluid flow when it enters into the drive-flow discharge slit 66 is less or equal to a critical pressure ratio. Consequently, the flow cross section of the drive-flow discharge slit 66 is adjusted in such a way that the pressure ratio between an output pressure of the drive-fluid flow when it leaves the drive-flow discharge slit 66 and an intake pressure of the drive-fluid flow when it enters into the drive-flow discharge slit 66 equals the critical pressure ratio. The adjustment of the desired flow cross section of the drive-flow discharge gap 66 is accomplished by supplying the piezo actuator 68 with a suitable current with the help of control signals, which are provided by an electronic control unit 85 as illustrated schematically in FIG. 1.

The drive-fluid that exits the drive-flow discharge slit 66 with sonic velocity flows along the curved interior wall 52 of the flow-guiding element 26 because of the Coanda effect. This creates a suction effect in the area of the suction intake 22, which causes large volumes of the fluid that is to be conveyed by the Coanda flow amplifier 10 to be sucked into the suction intake 22.

Figure 3:
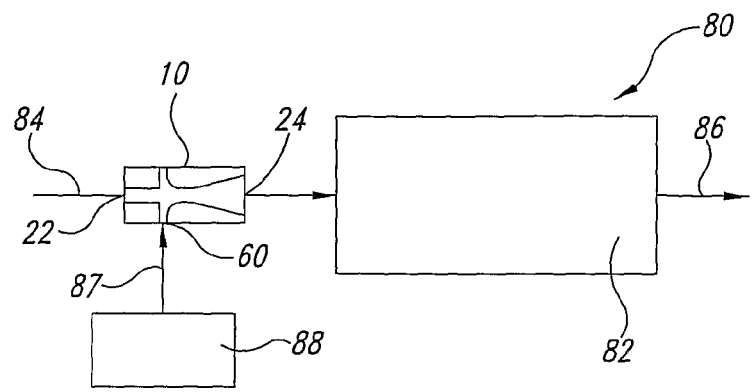
FIG. 3 is a diagrammatic representation of the design of a first embodiment of a fuel cell system according to the present systems and methods.

FIG. 3 shows the configuration of one embodiment of a fuel cell system 80, which comprises a fuel cell 82, a purge-gas feed line 84 that is connected to the fuel cell 82, as well as a purge-gas discharge line 86. A Coanda flow amplifier 10 (shown in FIGS. 1 and 2) is arranged in the purge-gas fee line 84, whereby both the suction intake (suction) 22 and the outlet (discharge) 24 of the Coanda flow amplifier 10 are connected to the purge-gas feed line 84. The drive-flow inlet 60 of the Coanda flow amplifier 10 is connected to a pressurized-air source 88 via a pressurized-air line 87.

During operation, the pressurized-air source 88 supplies the drive-flow inlet 60 of the Coanda flow amplifier 10 with pressurized air as drive fluid, via the pressurized-air line 87. As a result of the suction effect generated at the suction intake 22 of the Coanda flow amplified 10, a high flow volume of purge air is drawn in from the surroundings and is supplied to the fuel cell 82 via the purge-gas feed line 84.

During such operation, the flow cross section of the drive-flow discharge gap of the Coanda flow amplifier 10 is chosen so that the pressure ratio between the output pressure of the drive-fluid flow when it leaves the drive-flow discharge slit 66 and the intake pressure of the drive-fluid flow when it enters into the drive-flow discharge slit 66 equals the pressure ratio of 0.528. The adjustment of the flow cross section of the drive-flow discharge slit is accomplished by supplying the piezo actuator 68 of the Coanda flow amplifier 10 with a suitable current with the help of control signals, which are provided by an electronic control unit 85.

Figure 4:
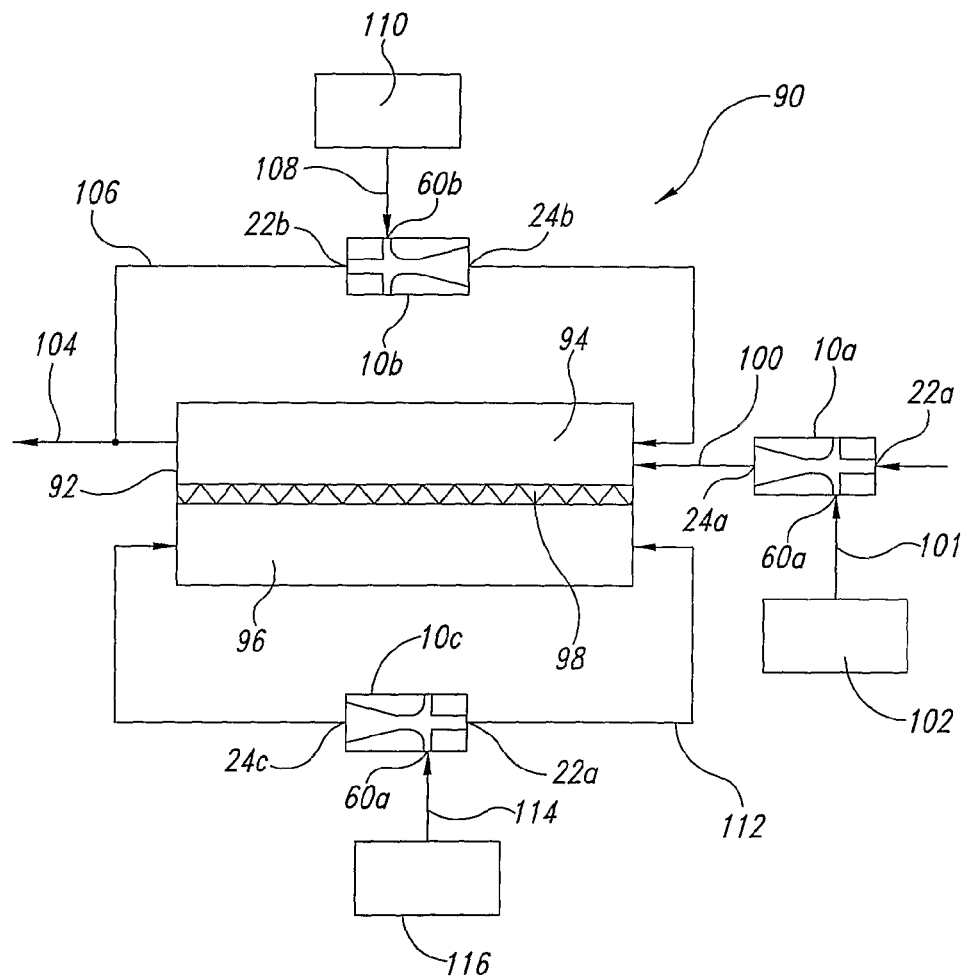
FIG. 4 is a diagrammatic representation of the design of a second embodiment of a fuel cell system according to the present systems and methods.

FIG. 4 shows a further embodiment of a fuel cell system 90, which comprises a fuel cell 92 with a cathode side 94, an anode side 96, and a membrane 98 separating the cathode side 94 and the anode side 96. A first Coanda flow amplifier 10 (such as shown in FIGS. 1 and 2) is arranged in a cathode gas feed line 100, whereby both the suction intake 22a and the outlet 24a of the Coanda flow amplifier 10a are connected to the cathode gas fee line 100. The drive-flow inlet 60a of the Coanda flow amplifier 10a is connected to a pressurized-air source 102 via a pressurized-air line 101.

During operation, the drive-flow inlet 60a of the Coanda flow amplified 10a is supplied by the pressurized-air source 102 with pressurized air as drive fluid via the pressurized-air line 101. As a result, air is drawn from the surroundings into the suction intake 22a of the Coanda flow amplifier 10a and is supplied to the cathode side 94 of the fuel cell 92 via the cathode gas feed line 100.

Cathode exhaust gas that has been discharged on the cathode side 94 of the fuel cell 92 via a discharge line 104, is at least partially recirculated to the cathode side 94 of the fuel cell 92 via a cathode exhaust gas return line 106. For the purpose of regulating the volume of cathode exhaust gas to be recirculated, the discharge line 104 is connected with the cathode exhaust gas recirculation line 106 by a switchable valve that is not shown in FIG. 4. A second Coanda flow amplifier 10b (such as shown in FIGS. 1 and 2) is arranged in the cathode exhaust gas recirculation line 106, whereby both the suction intake 22b and the outlet 24b of the Coanda flow amplifier 10b are connected with the cathode exhaust gas recirculation line 106. The drive-flow inlet 60B of the Coanda flow amplifier 10B is connected to a further pressurized-air source 110 via a further pressurized-air line 108.

During operation, the drive-flow inlet 60b of the Coanda flow amplifier 10b is supplied by the further pressurized-air source 110 with pressurized air as derive fluid via the pressurized-air line 108. In this manner, the Coanda flow amplifier 10b provides a gas-flow drive for the cathode exhaust gas that is to be returned to the cathode side 94 of the fuel cell 92 via the cathode exhaust gas recirculation line 106.

Anode exhaust gas leaving the anode side 96 of the fuel cell 92 is returned to the anode side 96 of the fuel cell 92 via an anode exhaust gas return line 112. A third Coanda flow amplifier 10c (such as shown in FIGS. 1 and 2) is arranged in the anode exhaust gas return line 112, whereby both the suction intake 22c and the outlet 24c of the Coanda flow amplifier 10c are connected to the anode exhaust gas return line 112. The drive-flow inlet 60c of the Coanda flow amplifier 10c is connected via a line 114 to an anode gas tank 116, which contains gaseous or liquid hydrogen.

During operation, the drive-flow inlet 60c of the Coanda flow amplifier 10c is supplied by the anode gas tank 116 with anode gas as drive fluid via the line 114, and the flow cross section of the drive-flow discharge slit of the Coanda flow amplifier 10c is chosen so that the desired anode gas volume—which is dependent on the load state of the fuel cell 92—is supplied to the anode side 96 of the fuel cell 92. As already described in connection with the Coanda flow amplifier 10b arranged in the cathode exhaust gas return line 106, the Coanda flow amplifier 10c provides a gas-flow drive from the anode exhaust gas to be returned to the anode side 96 of the fuel cell 92 via the anode exhaust gas recirculation 112.

During operation of the fuel cell system 90, each of the flow cross sections of the drive-flow discharge slits of the Coanda flow amplifiers 10a, 10b, 10c is chosen so that the pressure ratio between the output pressure of the drive-fluid flow when it leaves the drive-flow discharge slit of the respective Coanda flow amplifier 10a, 10b, 10c and the intake pressure of the drive-fluid flow when it enters into the drive-flow discharge slit of the respective Coanda flow amplifier 10a, 10b, 10c is equal to the critical pressure ratio 0.528. The adjustment of the flow cross sections of the drive-flow discharge slits is accomplished by supplying the respective piezo actuator 68 of the Coanda flow amplifiers 10a, 10b, 10c with suitable currents with the help of control signals, which are provided by an electronic control unit 85.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A Coanda flow amplifier, comprising:
    a suction intake;
    an outlet;
    a fluid channel extending between the suction intake and the outlet;
    a drive flow inlet that is in fluid flow communication with the fluid channel via a drive-flow discharge slit; and
    an electronic control unit that adjusts the flow cross section of the drive-flow discharge slit after assembly of the Coanda flow amplifier such that a pressure ratio between an output pressure of the drive flow that leaves the drive-flow discharge slit and an intake pressure of the drive flow that enters the drive-flow discharge slit does not exceed a critical pressure ratio.

2. The Coanda flow amplifier according to claim 1, wherein the drive-flow discharge slit can be completely closed.

3. The Coanda flow amplifier according to claim 1, wherein the Coanda flow amplifier comprises a flow-guiding element that is arranged between the suction intake and the outlet, and is axially displaceable along a longitudinal axis of the Coanda flow amplifier.

4. The Coanda flow amplifier according to claim 3, wherein:
the suction intake is arranged in a first housing section; and
the drive-flow discharge slit is formed between a downstream face of the first housing section and an upstream face of the flow-guiding element.

5. The Coanda flow amplifier according to claim 3 wherein at least in an area of the drive-flow discharge slit, the flow-guiding element is surrounded by a chamber that connects the drive-flow inlet with the drive-flow discharge slit.

6. The Coanda flow amplifier according to claim 5, wherein the auxiliary displaceable flow-guiding element carries through to the second housing section and is guided in the second housing section in a sealed manner.

7. The Coanda flow amplifier according to claim 3, wherein:
the outlet is arranged in a third housing section; and
a downstream section of the flow-guiding element protrudes into the third housing section and is guided in the third housing section in a sealed manner.

8. The Coanda flow amplifier according to claim 7, wherein a sealing element seals the flow-guiding element against the third housing section; and
the sealing element is arranged in a groove formed on the third housing section and works together with a circumferential surface of the flow-guiding element.

9. The Coanda flow amplifier according to claim 6, wherein quasi-static sealing elements are provided to seal the flow-guiding element against at least one of the second and third housing sections.

10. The Coanda flow amplifier according to claim 3, wherein an actuating element is provided to effect the axial displacement of the flow-guiding element.

11. The Coanda flow amplifier according to claim 10, wherein the actuating element is a piezo actuator.

12. The Coanda flow amplifier according to claim 10, wherein the flow-guiding element is resiliently pre-loaded in a direction opposite to the fluid-flow direction in the fluid channel to close the drive-flow discharge slit when the actuating element is in its inactive state.

13. The Coanda flow amplifier according to claim 1, wherein the flow cross section of the drive-flow discharge slit is variably adjustable during operation of the Coanda flow amplifier.

* * * * *